UNITED STATES PATENT OFFICE.

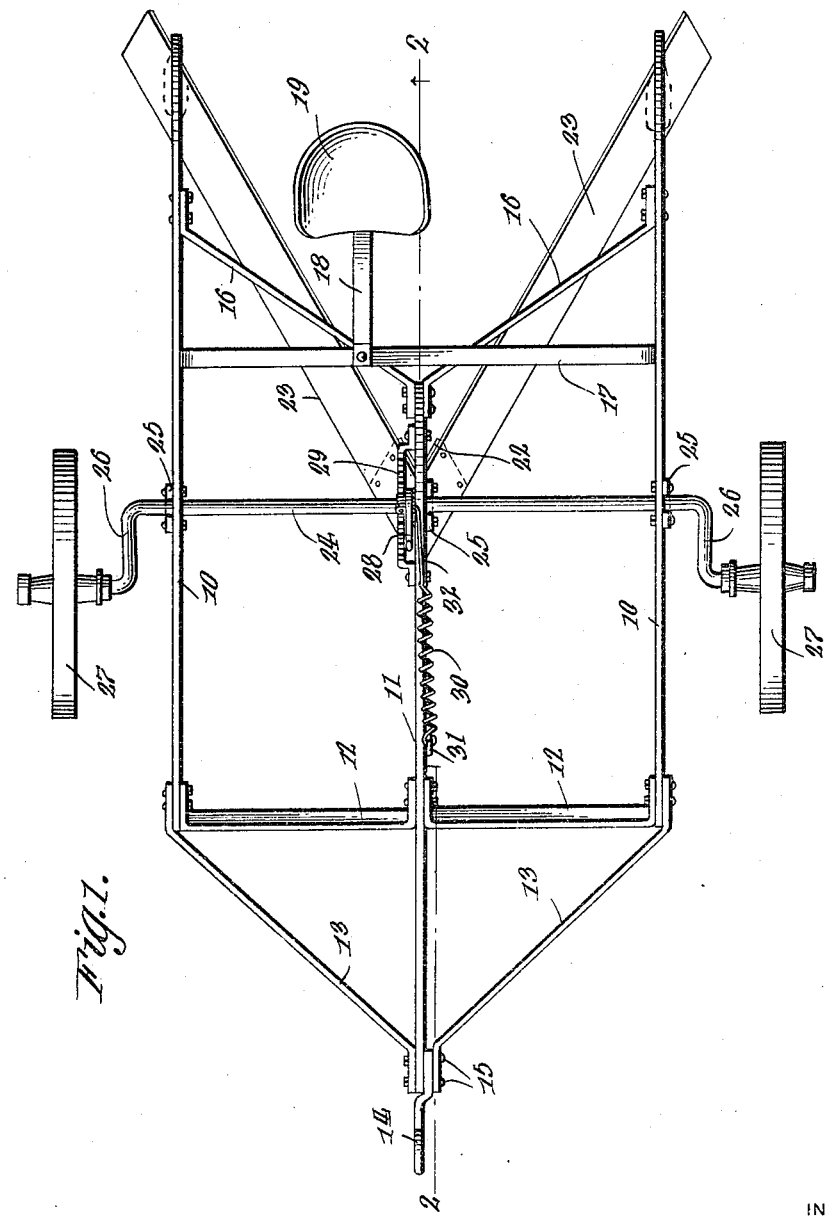

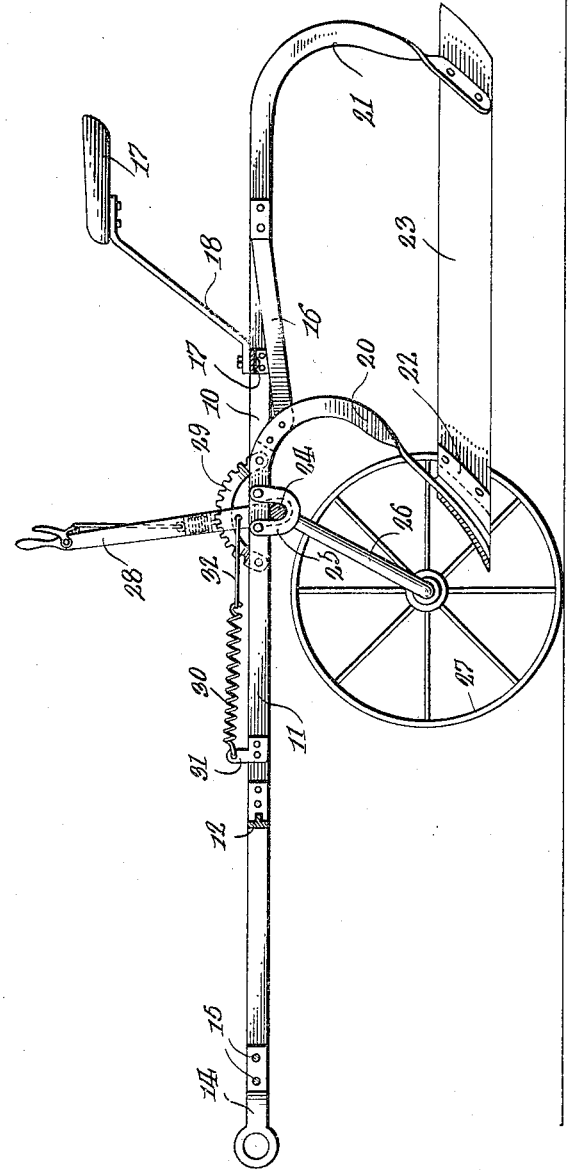

ADOLF GRUENEICK, OF AMERICAN FALLS, IDAHO.

AGRICULTURAL IMPLEMENT.

1,271,702.

Specification of Letters Patent.    Patented July 9, 1918.

Application filed March 9, 1917. Serial No. 153,643.

*To all whom it may concern:*

Be it known that I, ADOLF GRUENEICK, a citizen of the United States, residing at American Falls, in the county of Powers and State of Idaho, have invented certain new and useful Improvements in Agricultural Implements, of which the following is a specification.

This invention relates to an improved agricultural machine of the type known as weeders and the principal object of the invention is to provide a weeder having an improved frame construction so constructed that the frame may be swung upwardly to draw the cutting blade out of engagement with the ground and to further so construct this device that the frame when lowered may be releasably held at an adjusted position and thus the blade held to enter the ground a desired distance or to barely touch the surface of the ground if so desired.

Another object of the invention is to so construct this machine that the driver may adjust the same without leaving the seat.

Another object of the invention is to provide a machine of the character described which will be strong and durable but at the same time comparatively simple in construction.

This invention is illustrated in the accompanying drawings, wherein:—

Figure 1 is a top plan view of the improved machine,

Fig. 2 is a vertical sectional view taken along the line 2—2 of Fig. 1.

The frame or carriage of this agricultural machine is provided with side beams 10 and a center beam 11 which extends beyond the forward ends of the side beams and is connected with the forward ends of the side beams by the cross bars 12 and inclined beams 13, a clevis 14 being positioned as braces 13, a clevis 14 being positioned as shown in Fig. 1 and held in place by the securing bolts 15 for the forward ends of the braces 13 so that a draft equalizer may be connected with the machine. The rear end of this center beam 11 terminates short of the rear ends of the side beams 10 and is braced by the diagonal braces 16, a cross bar 17 being provided to brace the side beams and further provide a support for the standard 18 of the driver's seat 19. These beams 10 and 11 terminate in downwardly curved arms 20 and 21 which have their free end portions twisted as shown in Fig. 2, the lower end of the center beam 11 being connected with a shoe or plate 22 with which the forward ends of the blades 23 are connected. These blades 23 extend as shown in Fig. 1 and have their rear end portions connected with the free ends of the side beams 10 and provide a substantially triangular or wedged shaped earth working implement which when in an operative position, will either cut the weeds close to the ground or will cut into the ground a desired amount according to the adjustment of the machine.

This machine may be used either for cutting weeds above or below the surface of the ground or it may be used simply for loosening the ground and thus permitting ventilation. The axle 24 is rotatably mounted in bearings 25 carried by beams 10 and 11 and is provided with bent end portions forming crank arms or standards 26 which in their turn are bent to provide spindles upon which the supporting wheels 27 will be rotatably mounted. This axle will be rotatably supported in the bearings 25 and it will thus be seen that by rotating the axle, the frame may be swung upwardly or downwardly thus vertically adjusting the machine for the purpose previously described. A latch lever 28 is rigidly fastened upon the axle 24 and is positioned in operative relation to a rack or quadrant 29. A spring 30 has one end connected with the bracket 31 and its rear end connected with a rod or link 32 carried by the latch lever. It will thus be seen that this spring will assist movement of the latch lever in one direction and will serve to retard movement of the latch lever in the opposite direction. The latch lever is to be thrown forwardly when rotating the axle to swing the frame or carriage upwardly and will be moved rearwardly when moved to rotate the axle and lower the carriage. This spring will therefore serve to increase the ease with which the carriage can be raised and prevent danger of its moving downwardly too rapidly. It is of course, understood that if desired, the cutting blades 23 may be secured to the beams 10 and 11 by the removable fasteners thus permitting them to be removed for sharpening.

What is claimed is:—

An agricultural implement comprising a carriage having longitudinally extending side beams, a longitudinally extending central beam, the central beam terminating short of the rear ends of the side beams and extending beyond the forward ends of the side beams, cross bars connecting the forward ends of the side beams with the central beam at a point intermediate the length of the central beam, diagonally extending bracing bars connecting the forward ends of the side beams with the forward end of the central beam, diagonally extending bracing bars connecting the rear end portion of the central beam with the rear end portions of the side beams, a V-shaped ground engaging blade having its diverging side arms connected at their forward ends and engaged by the central beam, the rear end portions of the side arms of the ground engaging blade being engaged by the side beams, an axle connected with the beams and provided with wheel spindles and supporting wheels mounted upon the wheel spindles.

In testimony whereof I affix my signature in presence of two witnesses.

ADOLF GRUENEICK.

Witnesses:
J. P. MEHLHAFF,
P. D. WEBER.

Copies of this patent may be obtained for five cents each, by addressing the "Commissioner of Patents, Washington, D. C."